United States Patent Office 3,410,910
Patented Nov. 12, 1968

---

3,410,910
CATALYTIC PROCESS FOR PREPARING UNSATURATED ALDEHYDES
Nicola Giordano, Giorgio Caporali, Natale Ferlazzo, and Lamberto Roberti, Milan, Italy, assignors, by mesne assignments, to Montecatini Edison S.p.A., Milan, Italy, a corporation of Italy
No Drawing. Filed Oct. 28, 1963, Ser. No. 319,534
Claims priority, application Italy, Oct. 31, 1962, 21,456/62
6 Claims. (Cl. 260—604)

ABSTRACT OF THE DISCLOSURE

A process for producing acrolein or methacrolein from propylene or isobutylene, respectively, wherein a reactant gas mixture containing oxygen and the propylene or isobutylene in an oxygen/olefin molar ratio of 0.5 to 2.5 is passed over a catalyst system consisting of the tellurium salt of at least one heteropolyacid having cerium as the co-ordinating element and tungsten, molybdenum or vanadium as the coordinated element at a temperature of 400 to 500° C. for a catalyst-contact time of 0.1 to 3 seconds.

---

This invention relates to the preparation of unsaturated aliphatic aldehydes.

Processes for the preparation of unsaturated aliphatic aldehydes are known in which an olefin is reacted with oxygen in the presence of a specific catalyst. In general, the known processes are not fully satisfactory in that they exhibit a relatively low selectivity, i.e., a low yield of the desired unsaturated aldehyde, coupled with the formation of large quantities of byproducts which, apart from representing a loss of starting compounds, make the recovery of the desired unsaturated aldehyde in the pure state more difficult.

Other disadvantages of the known processes are that there is a low conversion for each pass of the olefin over the catalyst so that the olefin has to be recycled; that a relatively long contact time is required to obtain a satisfactory conversion of the olefin to the aliphatic aldehyde; and that the catalysts used need frequently to be regenerated.

It is an object of the present invention to obviate the above-noted disadvantages.

In accordance with the invention there is provided a process for the production of unsaturated aliphatic aldehydes which includes reacting an olefinic hydrocarbon in the gaseous phase with oxygen, or a gas containing oxygen, in the presence of a catalyst which comprises a heteropoly compound obtained by reacting at least one heteropolyacid having as a co-ordinating element a rare-earth element of either the actinide or the lanthanide series and including as a co-ordinated element at least one of the elements tungsten, molybdenum and vanadium, or an ammonium salt of such an acid, with a salifying compound containing bismuth or tellurium.

Heteropolyacids are considered as resulting from two or more molecules of two or more different acids by elimination of water molecules (heterodiacids, heterotriacids, heterotetraacids). More particularly they may be considered as resulting from the union of a definite number of molecules of acid anhydrides, defined as the co-ordinated elements, with molecules of a second acid that supplies the central atom (defined as the co-ordinating element) of the polyanionic complex.

Particularly good results are obtained if the catalyst is obtained from one of the acids represented by the formulae:

in which:

A is cerium or thorium; and
D is tungsten or molybdenum;

and ceric-10-molybdo-2-vanadic acid $(H_8CeMo_{10}V_2O_{41})$ and thorium-10-molybdo-2-vanadic acid

The preferred bismuth or tellurium containing compounds are the salts of organic or inorganic acids containing either of these elements. Preferably the compound is soluble in at least one of the following solvents: water, alcohols, ethers and esters.

The preferred catalysts for use in the process of the invention may be represented by the following two general formulae:

in which

Me is bismuth or tellurium;
$x$ is a number between about 0.2 and about 18;
A is cerium or thorium;
D is tungsten or molybdenum; and
$y$ is a number which depends on the value of $x$ and the valency of the salifying element Me, and usually has a value between about 38 and about 74 and

in which

Me is bismuth or tellurium;
$x$ is a number between about 0.2 and about 18;
A is cerium or thorium; and
$y$ is a number between about 37 and about 73.

The catalysts may be used either by themselves or mixed with each other. They may also be used in admixture with a suitable support. Furthermore, they are effective when used both as a fixed and as a fluid bed.

The process according to the invention is particularly suitable for the preparation of unsaturated aldehydes from aliphatic olefins having straight or branched chains and containing at least three carbon atoms and at least one methyl group in an alpha-position with respect to the olefinic double bond.

The process is particularly effective and gives excellent yields when propylene is used for obtaining acrolein, and isobutene for methacrolein.

The olefin may be used in the pure state; however, it has been found that the reaction proceeds equally well when the olefins are diluted with paraffinic hydrocarbons which do not react under the conditions of the process and which behave to all intents and purposes as inert diluents.

The oxygen necessary for the reaction may be supplied either in the pure state or in the form of gases, such as, for example, air, containing it. Air in some cases has an advantage in that the nitrogen serves as a diluent and thereby assists in controlling the reaction which is exothermic. Examples of other substances which can be used as diluents are paraffinic hydrocarbons, e.g., those that are found already mixed with the raw olefin used, nitrogen, carbon dioxide, steam, etc.

The nature and quantity (if any) of diluent to be used in any given case depends on a number of factors such as the reaction conditions; the degree of conversion obtained and thereby the quan.ity of heat developed; the selectivity, in order to minimize accompanying side reactions which, being more exothermic than the main reaction, require greater quantities of diluent for the thermal control of the process; and the techniques used, that is to say whether the reaction is effected on a fixed or fluid bed, as well as on the equipment involved.

The catalysts used in the process of the invention exhibit very high selectivity so that highly exothermic side reactions are inhibited and the quantity of supplementary diluent in the feed need not be very great and in some cases may even be omitted altogether, especially when air is used to supply the oxygen.

The quantity of oxygen, or of the gas containing it, used in relation to the quantity of employed olefin may vary within wide limits. Preferably, however, the molar ratio between the oxygen and the olefin is between 0.5 and 2.5.

Some gaseous mixtures of olefin and oxygen of certain specific compositions may behave as explosive mixtures. However, the process according to this invention may be carried out even when these circumstances exist.

While the reaction is generally effected with excellent results under atmospheric pressure, it can also be performed at superatmospheric pressures.

The invention is preferably carried out at temperatures ranging from about 300° C. to 600° C. However, temperatures in the range between 400° C. and 550° C. are partially preferred because at such temperatures the reaction rate is so high that appreciable conversion rates are attained also by relatively short contact times.

The contact time (expressed as the time during which unit volume of the gaseous feed mixture, measured under the average conditions of temperature and pressure existing in the reactor, comes into contact with an apparent unit volume of catalyst) may vary within a wide range, for instance from 0.05 to 20 seconds, but, it has been found that, owing to the high activity of the catalysts, contact times shorter than 1 second are sufficient for obtaining a high conversion, and the preferred contact time is between about 0.1 and about 3 seconds.

The heteropolycompounds used as catalysts in the process according to the invention may be prepared in the following way. First the free heteropolyacid or its ammonium salt is prepared by following the general methods described in the literature for their preparation. This heteropolyacid, or its ammonium salt, is then reacted with a compound of the desired salifying element in a liquid reaction medium and in the presence of small quantities of a strong acid.

The two reactants, that is the heteropolyacid, or the ammonium heteropolysalt, and the compound containing the salifying element, are reacted in stoichiometric amounts in order to obtain as the reaction product the heteropolysalt of the desired element; it is, however, also possible to use an excess or a deficiency with respect to the theoretical value of the compound of the salifying element.

Depending on the solubility of the reactants, the reaction may be effected between the solution or the suspension in suitable solvents of the two reactants. The preferred solvent is water, though other solvents, and particularly organic solvents such as alcohols, ethers and esters, may also be used. The reaction is effected in the presence of strong mineral acids; in particular, nitric acid.

The conditions at which the reaction is carried out (for instance temperature, rate of stirring, order of feeding of the reactants and so on) are not critical for obtaining catalysts usable in the process according to the invention.

According to another aspect of our invention it is possible to react the compound containing the salifying element with the ammonium heteropolysalt in the same reaction medium in which the heteropolysalt has been obtained. This is carried out by mixing first the solution of a salt or of an acid containing the co-ordinated elements with a solution of an acid or a salt containing the co-ordinating element, and by then adding to the mixture thus obtained the solution of a compound of the salifying element.

The product of the catalyst-preparation reaction is evaporated to dryness, for instance by heating it up to 110° C., and, preferably, is subsequently activated by a heat treatment at a temperature lying between 400° C. and 600° C. for a period from 5 to 20 hrs. The activation temperature should be equal to or higher than the temperature at which the catalyst will be operating.

The catalysts may be given a particular shape and/or size by any of the usual methods of grinding, sieving, pressing into tablets, and so on.

In an alternative method of preparing the catalyst the drying is stopped when the catalyst has reached a pasty consistency. The mass is then extruded in order to obtain a more homogeneous substance, and is finally activated by heat treatment as described above.

A further alternative method of preparation consists in drying the catalyst by a "spray-drying" system. The product obtained is in a form particularly suitable for use as a fluid bed.

Though the catalyst may be used without any support or carrier, it is preferred that a support or carrier be used as the effectiveness and the life of the catalyst are thereby enhanced.

Suitable substances for this purpose include silica, alumina, Alundum, refractory earths, or the like, which may be in the form of powders, tablets, pellets, granules, or in the form of a gel such as silica or alumina gel.

Among the supports which have proved particularly convenient are those which show a so-called "open structure," for instance the silica aerogels. The techniques most suitable for depositing the catalysts on the supports are well known in the art.

The process of the invention has considerable advantages compared to the known processes for the preparation of unsaturated aldehydes. In particular, it has been found that it is possible to obtain a high degree of conversion of the olefin without reducing the yield of the unsaturated aldehyde obtained from the reaction. A further important advantage lies in the high degree of selectivity shown by the catalysts used. The term "selectivity" is used to indicate that side reactions take place only to a comparatively small extent and that, therefore, only small quantities of byproducts and carbon oxides are formed. The absence of side reactions, which are highly exothermic, makes the thermal control of the process a relatively simple matter, thus avoiding special measures for dissipating the intense reaction heats. It will be readily understood by those skilled in the art that this is of considerable practical importance.

Yet a further advantage of the process results from the high resistance of the catalysts to deactivation, in consequence whereof the catalysts have a comparatively long life without an appreciable activity loss, and require only infrequent regeneration.

In order that the invention may be more fully understood, a number of examples of the process in accordance with it will now be given. In the examples, the quantities of the reactants are given in percentages by volume, whilst the yields are given in mole percentages.

The results given in the examples were obtained by chromatographic analysis, as well as by quantitative volumetric and gravimetric analyses or by gas-volumetric analysis.

EXAMPLE 1

Three catalysts (A, B, C) of bismuth ceric molybdate, which differ from each other in the percentage of this compound with respect to the carrier, are prepared as follows:

500 mils of a 5% solution of ammonium-ceric nitrate are added to a solution of 300 g. ammonium molybdate in 1000 ml. of water kept at boiling point. A crystalline yellow precipitate is immediately formed, which is separated by filtration, washed with ammonium nitrate solution and then with methanol, and finally dried in air. The compound obtained has the formula $(NH_4)_8CeMo_{12}O_{42} \cdot 8H_2O$.

To 228.4 g. of this ammonium salt of ceric molybdic acid dissolved in 260 ml. of water and 26 ml. of concentrated nitric acid are added a solution to 442.7 g. of bismuth nitrate and a quantity of a silica aerogel (as a carrier) which for catalyst A was 45.8 g., for catalyst B was 176 g., for catalyst C was 412 g. As silica aerogels the commercial products known under the trade names "Aerosil," "Cab-O-Sil" and "Santocel" may be employed.

The mixture obtained is evaporated until dry by heating to 110° C. for 14 hrs., and is then activated in a muffle furnace at 540° C. for 12 hrs.

The catalysts thus prepared are suitably subdivided and utilized in a fluid-bed reactor through which a gaseous mixture containing 13.5% propylene, 67.4% air and 19.1% water is passed.

It is found that 40.5% of the fed propylene is converted; acrolein yield is 78.8% with respect to converted propylene; only 4% of the fed propylene is transformed to carbon oxides.

In the following table the further reaction conditions and the obtained results are indicated:

| Catalyst | A | B | C |
| --- | --- | --- | --- |
| Reaction temperature (° C.) | 48.9 | 47.2 | 47.4 |
| Contact time (seconds) | 0.62 | 0.48 | 0.47 |
| Converted propylene | 40.5 | 40.0 | 34.6 |
| Acrolein yield (calculated with respect to converted propylene, percent) | 78.8 | 70.7 | 68.8 |
| Percent of fed in propylene transformed to carbon oxides | 4 | 6.1 | 8 |

EXAMPLE 2

A catalyst of tellurium ceric molybdate on a carrier is prepared as follows:

20.6 g. of tellurium dioxide in nitric solution and 143 g. of a silica aerogel are added to 145 g. of the ammonium salt of ceric-molybdic acid (prepared as set forth in Example 1) in 170 ml. of water and 16 ml. of nitric acid.

The mixture obtained is evaporated by dryness by heating to 110° C. and the mass of catalyst obtained is then activated by prolonged heating at 470° C. After suitable subdivision the catalyst is employed at a fluid bed in a reactor through which a gaseous mixture of 12.4% propylene, 61.8% air and 25.8% steam is fed.

Contact time is 0.8 second; temperature is kept constant at 437° C.

It is ascertained from the analysis of products that 58.7% of the fed-in propylene is converted and that the acrolein yield is 71.2% with respect to the converted propylene.

EXAMPLE 3

A gaseous mixture made up of 7.8% isobutene, 58.7% air, 33.5% steam is passed over the catalyst described in Example 2. Contact time is 0.6 second; the temperature is 438° C.

Methacrolein yield is 67.5% of the converted isobutene, which latter represents 40% of the isobutene feed.

EXAMPLE 4

A catalyst of bismuth ceric tungstate is prepared as follows:

29.3 g. of ceric-ammonium nitrate and 170 g. of ammonium tungstate are dissolved in 260 ml. of water. A solution of 234 g. of bismuth nitrate acidified with 26 ml. of nitric acid and 30 g. of a silica aerogel are then added.

The mixture obtained is brought to a consistency suitable for extrusion, and is then extruded and dried at 110° C. for 12–18 hrs. The dried mass is next activated at 540° C. for 12–18 hrs.

The thus prepared catalyst, after subdivision suitable for employment in a fluid bed, is placed in a reactor and a gaseous mixture is passed therethrough at constant temperature of 522° C., said mixture being formed of propylene, air and steam as diluent in the proportion of 9.6%, 59.7% and 30.7% respectively. The contact time of this mixture with the catalyst is 0.18 second.

Acrolein yield with respect to fed-in propylene is 13.1%.

EXAMPLE 5

A catalyst based on bismuth ceric molybdovanadate is prepared as follows:

30.4 g. of ammonium paramolybdate are dissolved in 125 ml. of water and the solution is passed through a bed of strong acid-exchanger resin of cationic type (for instance Amberlite IR–120). To the solution thus obtained are added 11 g. of sodium metavanadate and the solution is brought to the boil. A solution of 9 g. of ceric-ammonium nitrate in 100 ml. of water or a solution of 9 g. cerium carbonate in water containing ammonium carbonate is then added dropwise. The mixture is allowed to boil under stirring and refluxing for 1 hr. It is then filtered. The filtrate is concentrated and thereafter an acidic extraction with ethyl ether is performed.

The ethereal solution of the heterotriacid obtained is taken again with water and is then evaporated until crystallization begins. The product obtained has the formula $H_8(CeMo_{10}V_2O_{41})$.

In order to obtain the bismuth salt of the free heterotriacid, 0.1 mole of this latter, dissolved in water, are added to 129 g. of bismuth nitrate dissolved in water acidified with nitric acid; 26.5 g. of silica aerogel (as carrier) are then added.

The mass obtained is brought to dryness by heating it to 110° C. and is then activated at 540° C. for 12 hrs.

For the preparation of a similar catalyst containing an excess of the salifying element bismuth with respect to the heterotriacid, 0.1 mole of this latter are added to 436 g. of bismuth nitrate and 43 g. of silica aerogel operating as described above. The catalyst is then subdivided for employment in a reactor working according to the fluid-bed technique.

A gaseous mixture made up of propylene, air and steam in the proportions of 12.5%, 62.5% and 25%, respectively, is passed over the catalyst at a constant temperature of 450° C. for a contact time of 0.8 second. It is found that 54.5% of the propylene feed is converted.

Acrolein yield is 64% with respect to the converted propylene. 17.8% of the propylene feed is transformed to carbon oxides.

EXAMPLE 6

A catalyst of tellurium ceric molybdovanadate is prepared as follows:

The free ceric-molybdovanadic acid is first prepared as set forth in Example 5. The acid is then salified with tellurium by adding to an aqueous solution of 0.1 mole of free heterotriacid the solution obtained by attacking with $HNO_3$ 25.5 g. of metallic tellurium. 210 g. of silica aerogel (as a carrier) are then added. The mass obtained is brought to dryness by heating it to 110° C. and is then activated by heating at 490° C. for 12 hrs.

A gaseous mixture comprising 12.5% propylene, 62.5% air and 25% steam is passed over the subdivided catalyst placed in a reactor as a fluid bed. Contact time of said mixture with the catalyst is 0.85 second; temperature is kept constant at 373° C.

Acrolein yield is 61.4 with respect to the converted propylene.

EXAMPLE 7

A catalyst based on the bismuth salt of thoriomolybdovanadic acid is prepared as follows:

The free heterotriacid is first prepared by operating in a manner analogous to that described in Example 5 for the preparation of ceric-molybdovanadic acid, with, of course, the difference that in place of cerium nitrate or carbonate 9 g. of thorium nitrate in aqueous solution are employed.

An aqueous solution of 0.1 mole of the prepared free thoriomolybdovanadic acid is added to a solution (acidified with nitric acid) of 129 g. of bismuth nitrate, and 250 g. of a silica aerogel are poured onto the resulting mixture. The whole is then dried by heating to 110° C., and is then activated by heating at 540° C. for 8-12 hrs.

A similar catalyst may be obtained which contains an excess of the salifying element bismuth with respect to the heteropolyacid, by operating in a similar way and employing 436 g. of bismuth nitrate, rather than 129 as stated above, and 43 g. of silica aerogel.

Over the catalyst suitably activated and subdivided and placed as a fluid bed in a reactor is passed a gaseous mixture which contains 12% propylene, 65% air and 23% steam, at such a rate that its contact time with the catalyst is 0.8 second, while keeping the reaction temperature at 440° C. It is found that 64.9% of the propylene feed is converted, with an acrolein selectivity of 52.5 %.

To the end of obtaining unsaturated aldehydes according to the process of the present invention a catalytic system comprising at least one heteropolycompound having as a co-ordinating element lanthanium may be employed, with equally good yields, under suitable conditions.

We claim:

1. A process for producing acrolein or methacrolein from propylene or isobutylene olefin reactants, respectively, comprising the step of passing a gaseous mixture of oxygen and at least one of said olefin reactants in a molar ratio between 0.5 and 2.5 over a catalyst system consisting essentially of the tellurium salt of at least one heteropolyacid having cerium as the coordinating element selected from the group which consists of the compounds of formulas $Te_2CeMo_{12}O_{42}$ and $Te_2CeMo_{10}V_2O_{41}$, at a temperature of between 400° C. and 550° C. with a catalyst-contact time of about 0.1 second to 3 seconds.

2. The process defined in claim 1 wherein said tellurium salt has the formula $$Te_2CeMo_{12}O_{42}$$

3. The process defined in claim 1 wherein said tellurium salt has the formula $$Te_2CeMo_{10}V_2O_{41}$$

4. The process defined in claim 1 wherein said catalyst system is deposited on a silica or alumina support.

5. The process defined in claim 4 wherein said support is an aerogel silica.

6. The process defined in claim 1, further comprising the step of activating said catalyst system by heat-treating it at a temperature between 400° C. and 600° C. for a period between 5 and 20 hours.

References Cited

UNITED STATES PATENTS

| | | | |
|---|---|---|---|
| 2,373,942 | 4/1945 | Bergsteinsson | 260—604 |
| 2,744,928 | 5/1956 | Smith et al. | 260—530 |
| 2,941,007 | 6/1960 | Callahan et al. | 260—604 |
| 3,173,957 | 3/1965 | McDaniel et al. | 260—604 |
| 3,168,572 | 2/1965 | Voge et al. | 260—604 |

FOREIGN PATENTS

| | | |
|---|---|---|
| 839,808 | 6/1960 | Great Britain. |
| 605,502 | 10/1961 | Belgium. |

LEON ZITVER, *Primary Examiner.*

R. H. LILES, *Assistant Examiner.*